United States Patent
Allen et al.

(10) Patent No.: US 9,749,468 B1
(45) Date of Patent: Aug. 29, 2017

(54) AREA CODE AND CALL DURATION-AWARE CALL SCREENING

(71) Applicant: INTERNATIONAL BUSINESS MACHINES CORPORATION, Armonk, NY (US)

(72) Inventors: Tracy C. Allen, Oakland, CA (US); Charles J. Bryant, Binghamton, NY (US); Kevin D. McKenzie, Poughkeepsie, NY (US); Ajay K. Moluguru, Allen, TX (US); Eileen P. Tedesco, Sharon, CT (US); Cherri Vidmar, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/185,056

(22) Filed: Jun. 17, 2016

(51) Int. Cl.
*H04M 3/436* (2006.01)
*H04M 3/42* (2006.01)
*H04M 3/533* (2006.01)

(52) U.S. Cl.
CPC ....... *H04M 3/436* (2013.01); *H04M 3/42042* (2013.01); *H04M 3/42068* (2013.01); *H04M 3/42153* (2013.01); *H04M 3/53308* (2013.01); *H04M 2203/551* (2013.01)

(58) Field of Classification Search
USPC ........................................ 455/415
See application file for complete search history.

(56) References Cited

U.S. PATENT DOCUMENTS

| | | | |
|---|---|---|---|
| 6,298,122 B1 | 10/2001 | Horne | |
| 8,139,747 B2 | 3/2012 | Cha | |
| 8,855,723 B2 | 10/2014 | Lynch, III | |
| 8,913,994 B2 | 12/2014 | Edwards et al. | |
| 2002/0009184 A1 | 1/2002 | Shnier | |
| 2013/0324092 A1 | 12/2013 | Scott | |

(Continued)

FOREIGN PATENT DOCUMENTS

JP  2004159064 A  6/2004

OTHER PUBLICATIONS

Anonymous, "Time Zone Aware Call Screening," An IP.com Prior Art Database Technical Disclosure, Jan. 9, 2012, p. 1-2, IP.com No. IPCOM000214082D.

(Continued)

*Primary Examiner* — Joel Ajayi
(74) *Attorney, Agent, or Firm* — Michael O'Keefe

(57) ABSTRACT

A method for screening an incoming call is provided. The method may include receiving a transmission of the incoming call in a user device. The method may include determining the incoming call originates from an area code of a telephone number associated with the user device. The method may include determining call information associated with a telephone number is stored within a database. The method may include determining at least one previous call from the telephone number has a call duration that does not satisfy a user preconfigured call duration threshold. The method may include determining the at least one determined previous call satisfies a maximum short call duration threshold. The method may also include determining a previous call frequency count satisfies a user preconfigured frequency threshold. The method may further include displaying the incoming call and an incorrectly dialed call notification on a display screen of the user device.

20 Claims, 6 Drawing Sheets

(56) References Cited

U.S. PATENT DOCUMENTS

2014/0101611 A1 4/2014 Lang et al.
2015/0086001 A1 3/2015 Farrand et al.

OTHER PUBLICATIONS

IBM, "System and Method for Tracking and Managing Cellular Telephone Time Usage Base on Current Plan," An IP.com Prior Art Database Technical Disclosure, Aug. 9, 2004, p. 1-3, IP.com No. IPCOM000030392D.

IBM, "Making the Smart Phone Smarter," An IP.com Prior Art Database Technical Disclosure, Jun. 8, 2009, p. 1-3, IP.com No. IPCOM000183967D.

Mell et al., "The NIST Definition of Cloud Computing," National Institute of Standards and Technology, Sep. 2011, p. 1-3, Special Publication 800-145.

AREA CODE AND CALL DURATION-AWARE CALL SCREENING

BACKGROUND

The present invention relates, generally, to the field of computing, and more particularly to telecommunications.

Telecommunications may relate to the process of transmitting data between various devices using a variety of transmission connections, such as wire, radio, optical or electromagnetic systems. Communication across a telecommunication network may include telephone calling, which may relate to two users communicating with each other by utilizing a pair of devices, such as mobile phones, through a connection. The devices utilized to engage in telephone communication may allow for various supplemental services, such as voicemail, caller identification, and video calling.

SUMMARY

According to one embodiment, a method for screening an incoming call is provided. The method may include receiving a transmission of the incoming call in a user device. The method may also include determining the incoming call originates from an area code of a telephone number associated with the user device. The method may further include determining a plurality of call information associated with a telephone number of the incoming call is stored within a database based on determining the incoming call originates from the area code associated with the telephone number associated with the user device. The method may also include determining at least one previous call from the telephone number of the incoming call stored within the determined plurality of call information has a call duration that does not satisfy a user preconfigured call duration threshold based on determining the plurality of call information associated with the telephone number of the incoming call is stored within the database. The method may further include determining the at least one determined previous call satisfies a maximum short call duration threshold based on determining the at least one previous call from the telephone number of the incoming call has a call duration that does not satisfy the user preconfigured call duration threshold. The method may also include determining a previous call frequency count stored within the determined plurality of call information satisfies a user preconfigured frequency threshold based on determining the at least one determined previous call satisfies the maximum short call duration threshold. The method may further include displaying the incoming call and an incorrectly dialed call notification on a display screen of the user device based on determining the previous call frequency count satisfies the user preconfigured frequency threshold.

According to another embodiment, a computer system for screening an incoming call is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may also include determining the incoming call originates from an area code of a telephone number associated with the user device. The method may further include determining a plurality of call information associated with a telephone number of the incoming call is stored within a database based on determining the incoming call originates from the area code associated with the telephone number associated with the user device. The method may also include determining at least one previous call from the telephone number of the incoming call stored within the determined plurality of call information has a call duration that does not satisfy a user preconfigured call duration threshold based on determining the plurality of call information associated with the telephone number of the incoming call is stored within the database. The method may further include determining the at least one determined previous call satisfies a maximum short call duration threshold based on determining the at least one previous call from the telephone number of the incoming call has a call duration that does not satisfy the user preconfigured call duration threshold. The method may also include determining a previous call frequency count stored within the determined plurality of call information satisfies a user preconfigured frequency threshold based on determining the at least one determined previous call satisfies the maximum short call duration threshold. The method may further include displaying the incoming call and an incorrectly dialed call notification on a display screen of the user device based on determining the previous call frequency count satisfies the user preconfigured frequency threshold.

According to yet another embodiment, a computer program product for screening an incoming call is provided. The computer program product may include one or more computer-readable storage devices and program instructions stored on at least one of the one or more tangible storage devices, the program instructions executable by a processor. The computer program product may include program instructions to determine the incoming call originates from an area code of a telephone number associated with the user device. The computer program product may also include program instructions to determine a plurality of call information associated with a telephone number of the incoming call is stored within a database based on determining the incoming call originates from the area code associated with the telephone number associated with the user device. The computer program product may further include program instructions to determine at least one previous call from the telephone number of the incoming call stored within the determined plurality of call information has a call duration that does not satisfy a user preconfigured call duration threshold based on determining the plurality of call information associated with the telephone number of the incoming call is stored within the database. The computer program product may also include program instructions to determine the at least one determined previous call satisfies a maximum short call duration threshold based on determining the at least one previous call from the telephone number of the incoming call has a call duration that does not satisfy the user preconfigured call duration threshold. The computer program product may further include program instructions to determine a previous call frequency count stored within the determined plurality of call information satisfies a user preconfigured frequency threshold based on determining the at least one determined previous call satisfies the maximum short call duration threshold. The computer program product may also include program instructions to display the incoming call and an incorrectly dialed call notification on a display screen of the user device based on determining the previous call frequency count satisfies the user preconfigured frequency threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
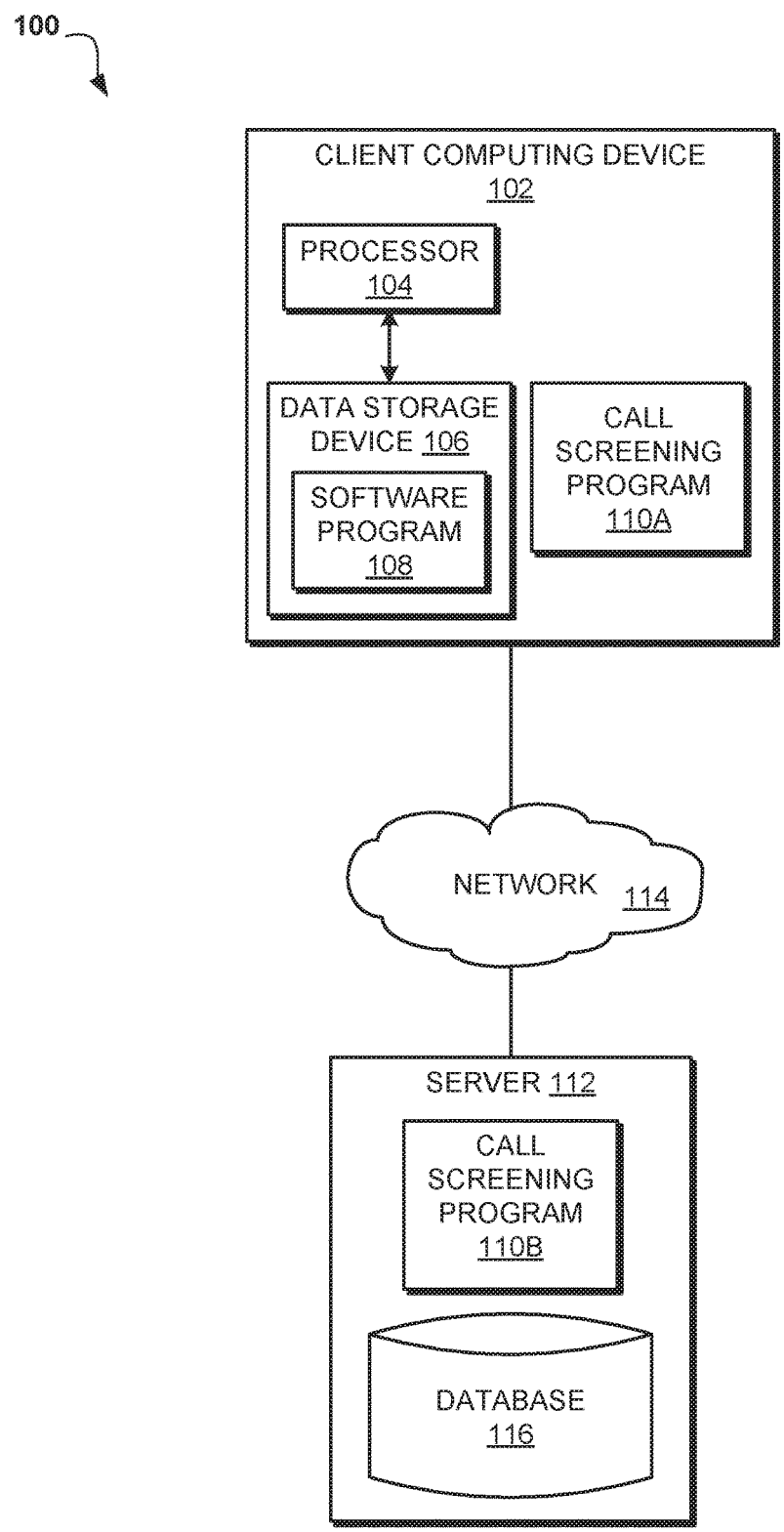
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to telecommunications. The following described exemplary embodiments provide a system, method, and program product to, among other things, determine whether an incoming call may be screened before being presented to a user based on recorded call information stored within a database. Therefore, the present embodiment has the capacity to improve the technical field of telecommunications by implementing a system that automatically screens incoming calls prior to transferring the call to the user. More specifically, caller number, call duration, and call frequency may be stored within a data repository and analyzed to determine whether to present an incoming call to the user.

As previously described, telecommunications may relate to the process of transmitting data between various devices using a variety of transmission connections, such as wire, radio, optical or electromagnetic systems. Communication across a telecommunication network may include telephone calling, which may relate to two users communicating with each other by utilizing a pair of devices, such as mobile phones, through a connection. The devices utilized to engage in telephone communication may allow for various supplemental services, such as voicemail, caller identification, and video calling.

A telecommunication device, such as a mobile phone, may have a telephone number assigned to the device based on a telephone numbering plan. A telephone number may be an assigned numerical address of a device that allows for location and communication with other devices. Each telephone number may be assigned using an area code and a subscriber number. The area code, or numeric routing code, assigned to a specific device may be based on the specific geographic region of the service area. Depending on the country in which a device is located, the assigned area code may be of a fixed or variable length. For example, if a device is located in the United States and assigned the telephone number "(123) 456-7890," the numbers "123" may identify the area code of the device. Furthermore, the subscriber number may relate to the remaining digits of an assigned telephone number following the area code. The subscriber number may be a sequence of integers assigned to a specific device from a service provider. In the previously described example, the device's subscriber number may be "456-7890."

Due to the vast number of devices capable of sending and receiving telephone calls, some telephone numbers may be substantially similar to other telephone numbers. Due to the similarity between some telephone numbers, a user may receive a large number of incorrectly dialed calls (i.e. "wrong numbers"). Such a situation may be exacerbated if the user's telephone number is substantially similar to the telephone number of a business or organization, since such an entity is likely to receive a higher call volume and, subsequently, a higher volume of incorrectly dialed calls. Furthermore, when the digits of a user's telephone number are within close proximity to the digits of another user's telephone number on a standard dial pad, the user may be the subject of many incorrectly dialed calls. For example, since the numbers "1" and "4" are adjacent to each other on a keypad or a dial pad, a user wishing to dial the number "(123) 456-7890" may mistakenly dial the number "(123) 156-7890." As such, it may be advantageous, among other things, to implement a system that utilizes a database of previous call information to filter out calls that are most likely incorrectly dialed.

According to one embodiment, an application may store previous call information, such as area code, previous call duration, and previous call frequency, in a database each time a user receives an incoming call. Whenever a call is subsequently received, the database of previous call information may be analyzed to determine when a user should be prompted with a notification that the incoming call may be incorrectly dialed. If, based on the previously stored call information, the user should not be prompted with a notification that the incoming call may be incorrectly dialed, the call may be automatically transferred to a voicemail service. Analysis of previous call information may be useful in situations where a particular phone number is substantially similar (e.g. one digit different) from a highly called number (e.g. a local business), a recycled number from a previous user, or when the physical location of at least one dialed digit on the caller's dial pad is adjacent to the corresponding digit in the recipient's number. An incoming call may be automatically transferred to voicemail if previous calls from the telephone number of the incoming call satisfy a user configured threshold for frequency and duration of calls. Conversely, a user may be prompted with an incoming call if no previous call information associated with the telephone number of the incoming call exists within the database.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product that analyzes stored call information within a database to determine whether a user should be prompted with an incoming call or if the incoming call should be automatically transferred to voicemail.

Referring to FIG. 1, an exemplary networked computer environment 100 is depicted, according to at least one embodiment. The networked computer environment 100 may include a client computing device 102 and a server 112 interconnected via a communication network 114. According to at least one implementation, the networked computer environment 100 may include a plurality of client computing devices 102 and a plurality of servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102 may include a processor 104 and a data storage device 106 that is enabled to host and run a software program 108 and a call screening program 110A and communicate with the server 112 via the communication network 114, in accordance with one embodiment of the invention. The client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a call screening program 110B and a database 116, and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the call screening program 110A, 110B may be a program capable of storing and analyzing previous call information stored within a data repository, such as database 116, to determine the likelihood that an incoming call is incorrectly dialed. The call screening method is explained in further detail below with respect to FIGS. 2A and 2B.

Figure 2A:
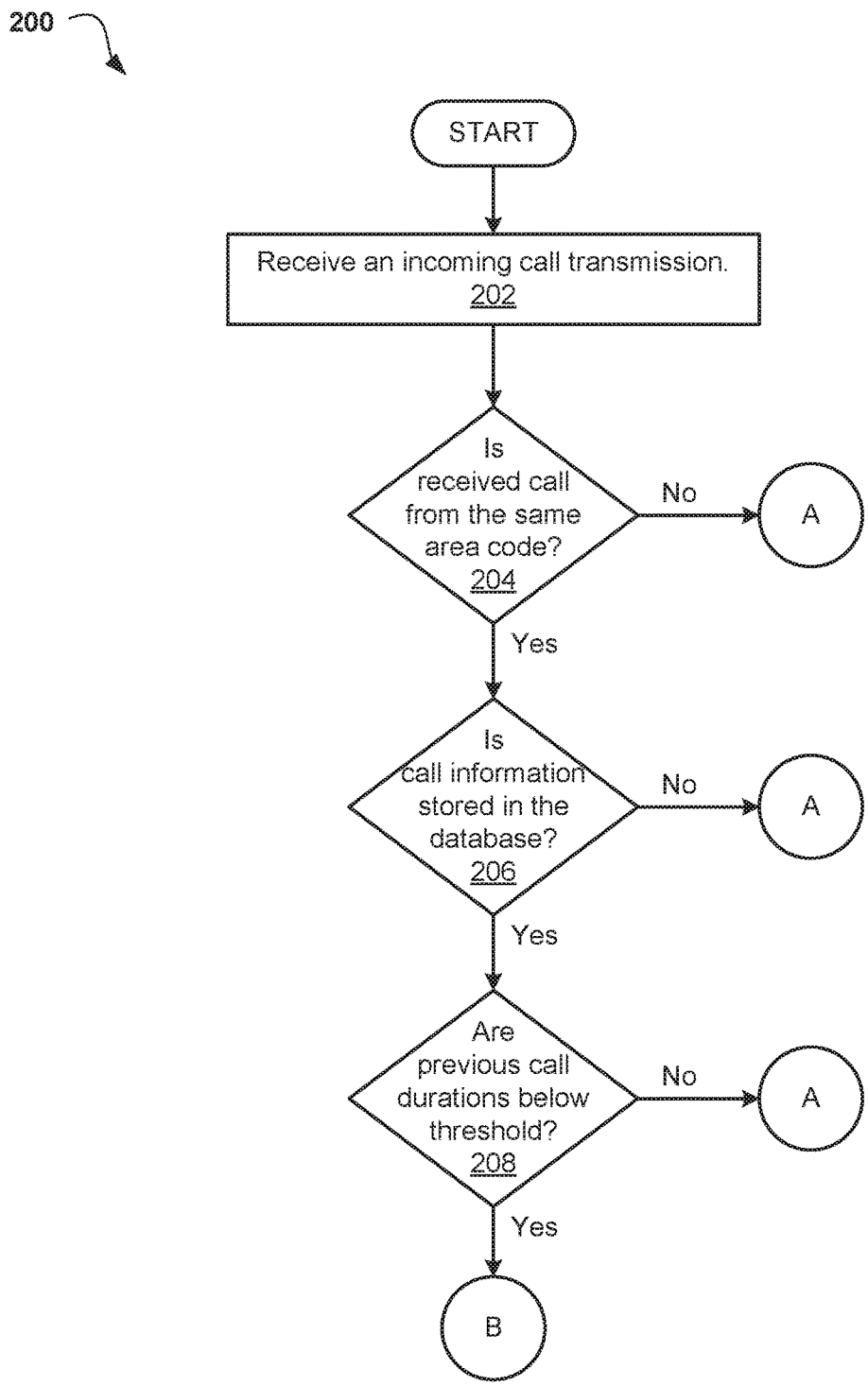
FIGS. 2A and 2B are an operational flowchart illustrating a call screening process according to at least one embodiment.
Figure 2B:
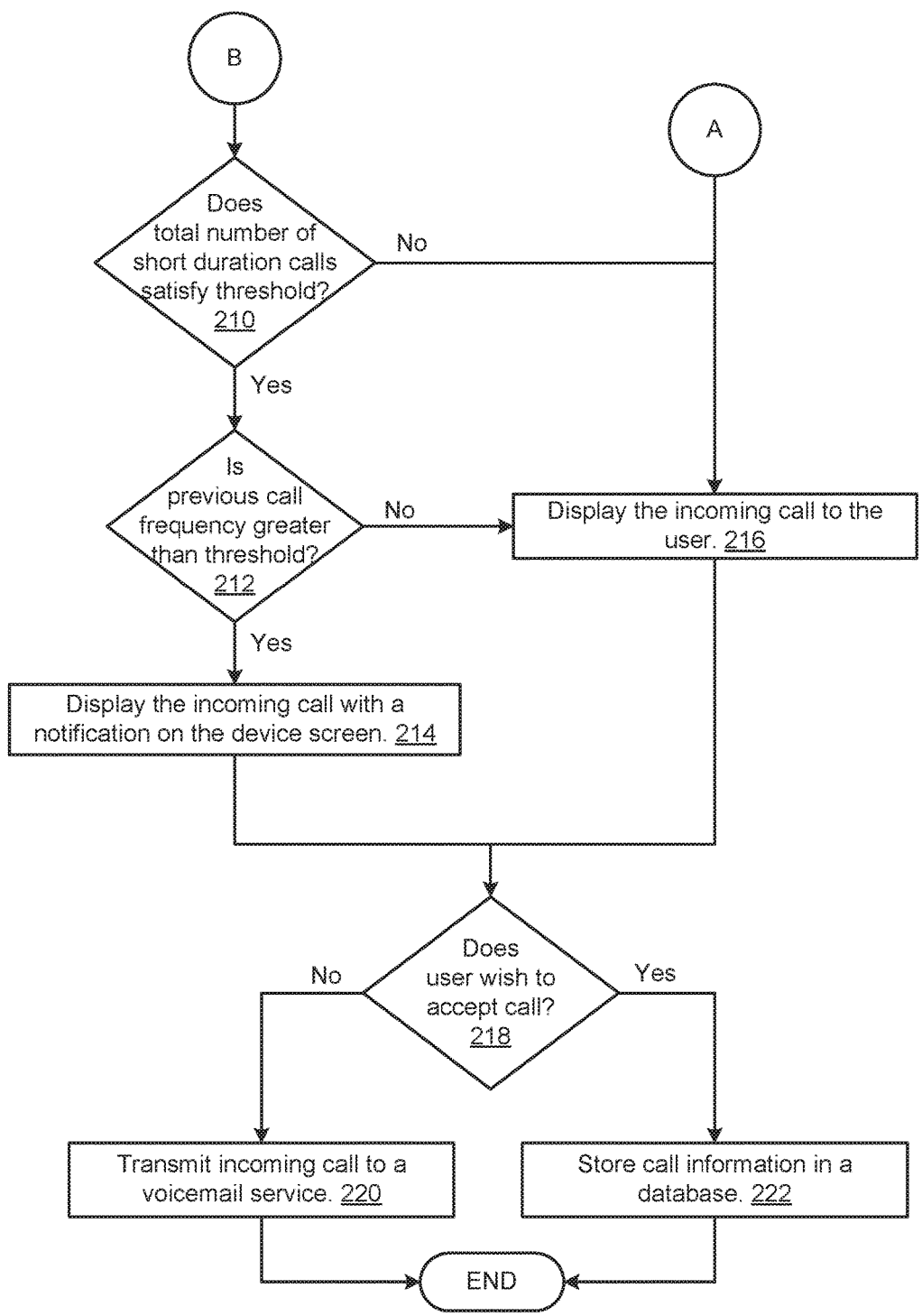

Referring now to FIGS. 2A and 2B, an operational flowchart illustrating a call screening process 200 is depicted, according to at least one embodiment. In FIG. 2A, at 202, the call screening program 110A, 110B (FIG. 1) receives an incoming call transmission sent to the client computing device 102 (FIG. 1). Since the client computing device 102 (FIG. 1) may be capable of receiving a call from another device, the call screening program 110A, 110B (FIG. 1) may persistently monitor the client computing device 102 (FIG. 1) for the incoming call. Additionally, the received incoming call may be a transmission requesting the commencement of a call session with the user's client computing device 102 (FIG. 1). The call session may be a voice call and/or a video call. For example, the incoming call transmission may be a telephone call sent from user A's smartphone to user B's smartphone. As an additional example, the incoming call transmission may be a video conferencing request sent from user A's laptop to user B's laptop. Furthermore, the incoming call transmission may be utilized to create a connection between a mobile device and a non-mobile device. For example, the incoming call transmission may be a video conferencing request sent from user A's smartphone to user B's personal computer. Additionally, the incoming call transmission may be created by a conferencing program, such as software program 108 (FIG. 1).

Then, at 204, the call screening program 110A, 110B (FIG. 1) determines whether the received incoming call originates from the same area code as the area code of the telephone number associated with the user device (i.e. client computing device 102 (FIG. 1)). The call screening program 110A, 110B (FIG. 1) may determine the received incoming call originates from the same (i.e. identical) area code as the area code of the telephone number associated with the user device if the area code of the telephone number associated with the received incoming call is the same as the area code of the telephone number associated with the user device. As previously described, the area code assigned to a specific device may be based on the specific geographic region of the service area. Therefore, if the incoming call has the same area code as the user device receiving the incoming call, the user device and the device transmitting the incoming call may be located within the same geographic region.

According to one implementation, the call screening process 200 may continue along the operational flowchart if the area code of the telephone number associated with the incoming call is the same as the area code of the telephone number associated with the user device. The call screening program 110A, 110B (FIG. 1) may analyze the incoming call to determine the area code of the telephone number associated with the incoming call. The call screening program 110A, 110B (FIG. 1) may then compare the determined area code of the telephone number associated with the incoming call with the area code of the telephone number associated with the user device. If the call screening program 110A, 110B (FIG. 1) determines the area code of the telephone number associated with the incoming call is the same as the area code of the telephone number associated with the user device (step 204, "Yes" branch), the call screening process 200 may continue to step 206 to determine whether the telephone number associated with the incoming call is stored within the database 116 (FIG. 1). If the call screening program 110A, 110B (FIG. 1) determines the area code of the telephone number associated with the incoming call is not the same as the area code of the telephone number associated with the user device (step 204, "No" branch), the call screening process 200 may continue to step 216 to display the incoming call to the user.

If the call screening program 110A, 110B (FIG. 1) determines the received incoming call originates from the same area code as the area code of the telephone number associated with the user device (step 204, "Yes" branch), then, at 206, the call screening program 110A, 110B (FIG. 1) determines whether call information of the telephone number associated with the incoming call is stored within the database 116 (FIG. 1). Database 116 (FIG. 1) may be a data repository capable of storing call information, such as telephone numbers of previously received calls, previous caller names, previous call durations, and previous call frequencies (e.g. the number of previous calls received from a particular telephone number). The call screening program 110A, 110B (FIG. 1) may be capable of analyzing the call information stored within the database 116 (FIG. 1) to determine whether the telephone number associated with an incoming call is stored within the database 116 (FIG. 1). For example, the call screening program 110A, 110B (FIG. 1) may search the database 116 (FIG. 1) to determine if any call information is stored within the database 116 (FIG. 1) for the telephone number or the caller name of the incoming call.

According to one implementation, the call screening process 200 may continue along the operational flowchart if call information of the telephone number associated with the incoming call is stored within the database 116 (FIG. 1). If the call screening program 110A, 110B (FIG. 1) determines call information of the telephone number associated with the incoming call is stored within the database 116 (FIG. 1) (step 206, "Yes" branch), the call screening process 200 may continue to step 208 to determine whether any previous call durations stored within the database 116 (FIG. 1) for the telephone number of the incoming call do not satisfy (i.e. are below) a user preconfigured call duration threshold. If the call screening program 110A, 110B (FIG. 1) determines call information of the telephone number associated with the incoming call is not stored within the database 116 (FIG. 1) (step 206, "No" branch), the call screening process 200 may continue to step 216 to display the incoming call to the user.

If the call screening program 110A, 110B (FIG. 1) determines call information of the incoming call is stored within the database 116 (FIG. 1) (step 206, "Yes" branch), then, at 208, the call screening program 110A, 110B (FIG. 1) determines whether any previous call durations stored within the database 116 (FIG. 1) for the telephone number of the incoming call do not satisfy a user preconfigured call duration threshold. As previously described, the database 116 (FIG. 1) may store call information, such as previous call durations. Furthermore, the call screening program 110A, 110B (FIG. 1) may be preconfigured by the user with a call duration threshold. The call duration threshold may be the user preconfigured call duration below which an incoming call may be considered an incorrectly dialed number. For example, if the user configures the call duration threshold within the call screening program 110A, 110B (FIG. 1) to 10 seconds, then any stored call within the database 116 (FIG. 1) that is below 10 seconds in length is considered an incorrectly dialed number by the call screening program 110A, 110B (FIG. 1).

According to one implementation, the call screening process 200 may continue along the operational flowchart if a previous call duration stored within the database 116 (FIG. 1) for the telephone number of the incoming call does not satisfy a user preconfigured call duration threshold. If the call screening program 110A, 110B (FIG. 1) determines a previous call duration stored within the database 116 (FIG. 1) for the telephone number of the incoming call does not satisfy the user preconfigured call duration threshold (step 208, "Yes" branch), the call screening process 200 may continue to step 210 to determine whether the total number of short duration calls stored within the database 116 (FIG. 1) for the telephone number of the incoming call satisfies (i.e. meets or exceeds) a maximum short duration call threshold. If the call screening program 110A, 110B (FIG. 1) determines all previous call durations stored within the database 116 (FIG. 1) for the telephone number of the incoming call satisfy a user preconfigured call duration threshold (step 208, "No" branch), the call screening process 200 may continue to step 216 to display the incoming call to the user.

In FIG. 2B, if the call screening program 110A, 110B (FIG. 1) determines a previous call duration stored within the database 116 (FIG. 1) for the telephone number of the incoming call does not satisfy the user preconfigured call duration threshold (step 208, "Yes" branch), then, at 210, the call screening program 110A, 110B (FIG. 1) determines whether the total number of short duration calls stored within the database 116 (FIG. 1) for the telephone number of the incoming call satisfies a maximum short duration call threshold. The call screening program 110A, 110B (FIG. 1) may also determine whether the number of short duration calls (e.g. previous calls stored within the database 116 (FIG. 1) that fall below the call duration threshold) is below a maximum short duration call threshold. For example, the maximum short duration call threshold may be preconfigured to three short duration calls. Therefore, the call screening program 110A, 110B (FIG. 1) may only advance past step 210 if three or more short duration calls are stored within the database 116 (FIG. 1) for the telephone number associated with the incoming call. Similar to the previously discussed call duration threshold, the maximum short duration call threshold may be user configurable.

According to one implementation, the call screening process 200 may continue along the operational flowchart if the total number of short duration calls stored within the database 116 (FIG. 1) satisfies a maximum short duration call threshold. If the call screening program 110A, 110B (FIG. 1) determines the total number of short duration calls stored within the database 116 (FIG. 1) satisfies a maximum short duration call threshold (step 210, "Yes" branch), the call screening process 200 may continue to step 212 to determine whether a previous call frequency count stored within the database 116 (FIG. 1) satisfies a user preconfigured frequency threshold. If the call screening program 110A, 110B (FIG. 1) determines the total number of short duration calls stored within the database 116 (FIG. 1) does not satisfy a maximum short duration call threshold (step 210, "No" branch), the call screening process 200 may continue to step 216 to display the incoming call to the user.

If the call screening program 110A, 110B (FIG. 1) determines the total number of short duration calls stored within the database 116 (FIG. 1) satisfies the maximum short duration call threshold (step 210, "Yes" branch), then, at 212, the call screening program 110A, 110B (FIG. 1) determines whether a previous call frequency count stored within the database 116 (FIG. 1) satisfies a user preconfigured frequency threshold. As previously described, the call information stored within the database 116 (FIG. 1) may include previous call frequencies, such as the number of times the user device has received a call from a particular telephone number. The previous call frequency count may be recorded within the database 116 (FIG. 1) by a call frequency counter that is incremented by the call screening program 110A, 110B (FIG. 1) after each call occurrence from a particular telephone number. Furthermore, the call screening program 110A, 110B (FIG. 1) may be preconfigured by the user with a call frequency threshold. The call frequency threshold may be a user preconfigured call frequency at or above which an incoming call may be considered an incorrectly dialed number. For example, if an incoming call telephone number has call information stored within the database 116 (FIG. 1) that has call durations that do not satisfy the call duration threshold, satisfy the maximum short duration calls threshold, and satisfy the call frequency threshold, then the user may have previously received one or more incorrectly dialed calls from the telephone number of the incoming call.

According to one implementation, the call screening process 200 may continue along the operational flowchart if the previous call frequency count stored within the database 116 (FIG. 1) satisfies a user preconfigured frequency threshold. If the call screening program 110A, 110B (FIG. 1) determines the previous call frequency count stored within the database 116 (FIG. 1) satisfies a user preconfigured frequency threshold (step 212, "Yes" branch), the call screening process 200 may continue to step 214 to display call and database information on the user device screen. If the call screening program 110A, 110B (FIG. 1) determines the previous call frequency count stored within the database 116 (FIG. 1) does not satisfy a user preconfigured frequency threshold (step 212, "No" branch), the call screening process 200 may continue to step 216 to display the incoming call to the user.

If the call screening program 110A, 110B (FIG. 1) determines a same area code telephone number has call information stored within the database 116 (FIG. 1) which satisfies the maximum short duration call threshold and the call frequency threshold, then, at 214, the call screening program 110A, 110B (FIG. 1) displays the incoming call with a notification that the incoming call may be incorrectly dialed on the device screen. The call screening program 110A, 110B (FIG. 1) may determine the incoming call should be displayed to the user on the screen of the client computing device 102 (FIG. 1) with a notification that the incoming call may be incorrectly dialed based on the call information stored within the database 116 (FIG. 1). The notification indicating the incoming call may be incorrectly dialed may be text (e.g. a word or brief phrase) notifying the user of the likelihood that the incoming call is incorrectly dialed. For example, the call screening program 110A, 110B (FIG. 1) may display the phrase "likely a wrong number" on the display screen of the client computing device 102 (FIG. 1). As an additional example, the call screening program 110A, 110B (FIG. 1) may use a color scheme to indicate the likelihood of an incoming call being incorrectly dialed, such as a red background for an incoming call that is highly likely incorrectly dialed or an orange background for an incoming call that is only possibly incorrectly dialed. The call screening program 110A, 110B (FIG. 1) may determine the likelihood level that a particular incoming call is incorrectly dialed based on the number of short duration calls in excess of the maximum short duration call threshold received from the telephone number associated with the incoming call and the total number of calls in excess of the call frequency threshold received from the telephone number associated with the incoming call.

If an incoming call is determined to not be from the same area code (step 204), the call information is not stored within the database 116 (FIG. 1) (step 206), the previous call durations do not satisfy the call duration threshold (step 208), the total number of short duration calls does not satisfy the maximum short duration call threshold (step 210), or the previous call frequencies do not satisfy the call frequency threshold (step 212), then, at 216, the call screening program 110A, 110B (FIG. 1) displays the incoming call to the user without a notification that the call may be incorrectly dialed. Similar to step 214, the call screening program 110A, 110B (FIG. 1) may display the incoming call on the display screen of the client computing device 102 (FIG. 1) thereby allowing for the user to accept or reject the incoming call by interacting with the client computing device 102 (FIG. 1). However, unlike step 214, the call screening program 110A, 110B (FIG. 1) may not display a notification that the call may be incorrectly dialed since not all of the criteria for the display of the notification described in steps 204-212 may have been met. For example, the area code of the telephone number associated with an incoming call may be the same as the area code of the telephone number associated with the client computing device 102 (FIG. 1), however, no previous call information may be stored within the database 116 (FIG. 1). Therefore, the call screening program 110A, 110B (FIG. 1) may not be able to fully determine the likelihood that the incoming call is incorrectly dialed and may only display the incoming call on the display screen of the client computing device 102 (FIG. 1).

Next, at 218, the call screening program 110A, 110B (FIG. 1) determines whether the user wishes to accept the call. Once the call screening program 110A, 110B (FIG. 1) displays the incoming call either with a notification (step 214) or without a notification (step 216) that the call may be incorrectly dialed, the user may decide whether to answer the incoming call. For example, the user may interact with a touchscreen of the client computing device 102 (FIG. 1) by swiping a bar with a finger to indicate the user wishes to accept the call. Furthermore, when a call is displayed on a display screen of the client computing device 102 (FIG. 1), the call screening program 110A, 110B (FIG. 1) may increment a scalar counter that tracks a call frequency count stored within the database 116 (FIG. 1) associated with the telephone number regardless of whether the user decides to answer the incoming call or transmit the incoming call to a voicemail service. The call frequency count may track the number of instances a call was received from the telephone number associated with the incoming call.

If the call screening program 110A, 110B (FIG. 1) determines the user does not wish to accept the call (step 218, "No" branch), the call screening process 200 may continue to step 220 to transmit the incoming call to a voicemail service. If the call screening program 110A, 110B (FIG. 1) determines the user wishes to accept the call (step 218, "Yes" branch), the call screening process 200 may continue to step 222 to store call information in the database 116 (FIG. 1).

According to an alternate embodiment, the call screening program 110A, 110B (FIG. 1) may automatically transfer the incoming call to voicemail, if the call screening program 110A, 110B (FIG. 1) determines the incoming call may be incorrectly dialed. For example, if the call screening program 110A, 110B (FIG. 1) determines the incoming call originates from the same area code and has call information stored within the database 116 (FIG. 1) that satisfies the maximum short duration call threshold and the call frequency threshold, then the call screening program 110A, 110B (FIG. 1) may automatically transfer the incoming call to voicemail rather than prompting the user.

If the call screening program 110A, 110B (FIG. 1) determines the user does not wish to accept the incoming call (step 218, "No" branch), then, at 220, the call screening program 110A, 110B (FIG. 1) transmits the incoming call to a voicemail service. The call screening program 110A, 110B (FIG. 1) may transmit, or forward, the incoming call to a voicemail service. Known voicemail service technology may allow for the recording of a message by a call sender so that call recipient can listen to the recording at a later time. By transmitting calls deemed most likely to be incorrectly dialed that the user does not wish to accept to a voicemail service, the call screening program 110A, 110B (FIG. 1) may allow the call sender to record a voicemail for the user thereby indicating the call may not have been incorrectly dialed. Conversely, if the incoming call was incorrectly dialed, the sender may end the incoming call and not record a voicemail for the user. Once the incoming call has been transmitted to a voicemail service, the call screening process 200 may terminate.

If the call screening program 110A, 110B (FIG. 1) determines the user wishes to accept the call through the user's interactions with the client computing device 102 (FIG. 1) (step 218, "Yes" branch), then, at 222, the call screening program 110A, 110B (FIG. 1) stores call information associated with the incoming call in the database 116 (FIG. 1). If the call screening program 110A, 110B (FIG. 1) determines the user wishes to accept the call through the user's interactions with the client computing device 102 (FIG. 1), the call screening program 110A, 110B (FIG. 1) may accept the incoming call transmission and store the call information in the database 116 (FIG. 1) for analysis of subsequent incoming calls. As previously described, the call information may include telephone numbers of previously received calls, previous caller names, previous call durations, and previous call frequencies. Therefore, the call screening program 110A, 110B (FIG. 1) may record and store the telephone number of the incoming call, the caller name associated with the telephone number, and the call duration based on previous call instances. For example, if the user has never received a call from the telephone number of the incoming call, the call screening program 110A, 110B (FIG. 1) may record and store the telephone number of the incoming call, the caller name, and the duration of the call, as well as start a call frequency count for the telephone number when the user answers an incoming telephone call. However, if the user has previously received a call from the telephone number of the incoming call, then the call screening program 110A, 110B (FIG. 1) may only record the call duration and increment the call frequency counter by one unit and then store the call information with previous call information associated with the telephone number of the incoming call in the database 116 (FIG. 1) upon completion of the call. Once the incoming call has completed and the call information is stored within the database 116 (FIG. 1), the call screening process 200 may terminate.

It may be appreciated that FIGS. 2A and 2B provide only an illustration of one implementation and do not imply any limitations with regard to how different embodiments may be implemented. Many modifications to the depicted environments may be made based on design and implementation requirements. For example, the call screening program 110A, 110B (FIG. 1) may utilize the following algorithm during execution:
{
Receive incoming call
  IF not "same area code" call allow user to accept call
  END
  ELSE "same area code" call
  IF number does not exist in database
    Add incoming number to database and duration of call
    Set call frequency to 1
  ELSE IF (number exists with no user-defined short durations)
    Accept call and add just the duration of the call (after it terminates)
    Increment call frequency
  ELSE (incoming "same area code" number exists AND has at >=1 user-defined short duration call)
    IF (number if calls greater/equal to than user-defined frequency maximum)
      Application will prompt user if user wishes to ACCEPT the call
      IF Yes, take call then log duration of current call upon completion and increment call frequency
      ELSE End call/Go to voice mail
    ELSE (number of calls less than user-defined frequency maximum)
      Accept call and add just the duration of the call (after it terminates)
      Increment call frequency
    END
  END
  END
}

Figure 3:
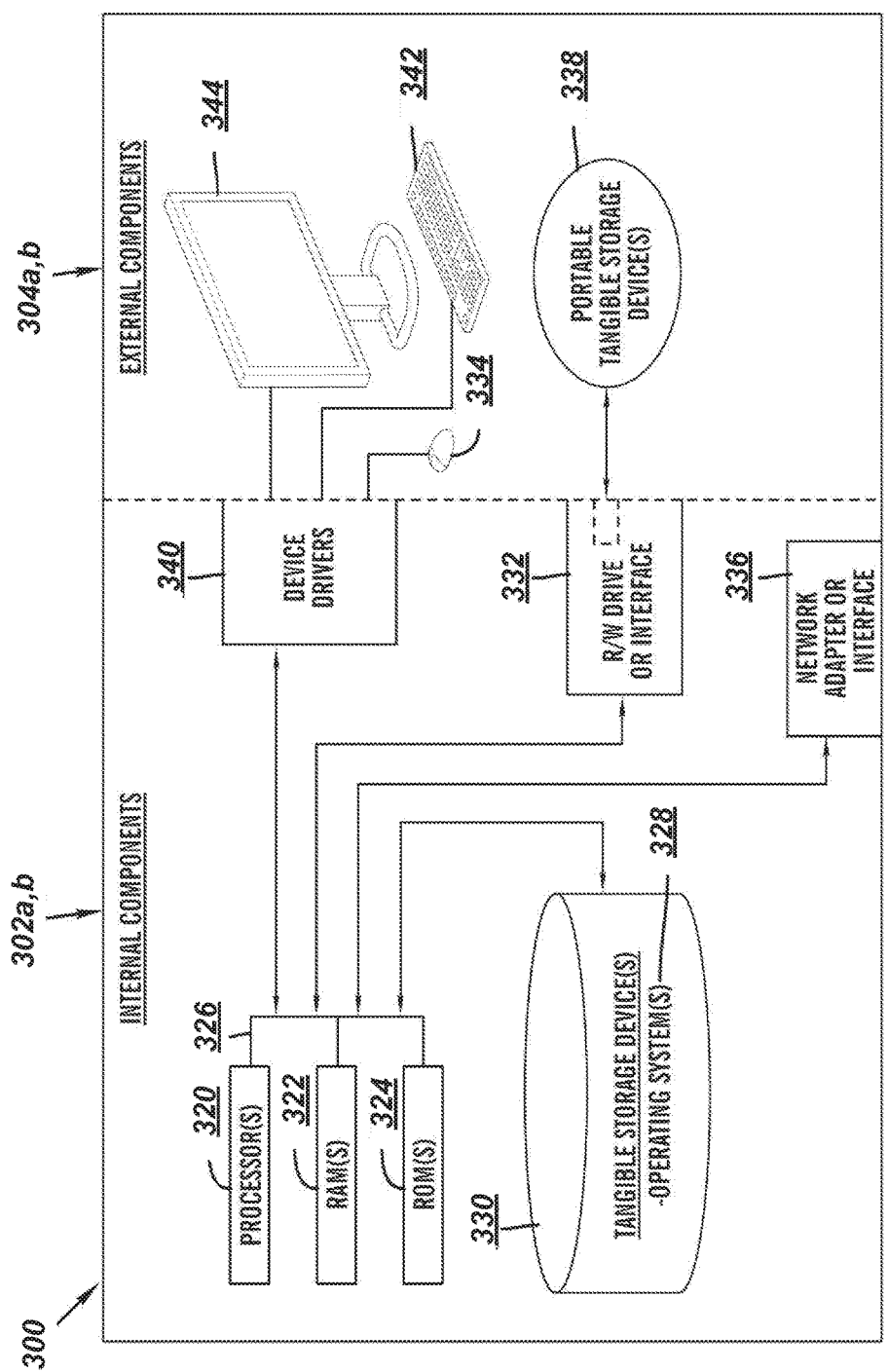
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 (FIG. 1) and the server 112 (FIG. 1) may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 (FIG. 1) and the call screening program 110A (FIG. 1) in the client computing device 102 (FIG. 1), and the call screening program 110B (FIG. 1) in the server 112 (FIG. 1) are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the call screening program 110A, 110B (FIG. 1), can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108 (FIG. 1) and the call screening program 110A (FIG. 1) in the client computing device 102 (FIG. 1) and the call screening program 110B (FIG. 1) in the server 112 (FIG. 1) can be downloaded to the client computing device 102 (FIG. 1) and the server 112 (FIG. 1) from an external computer via a network (for example, the Internet, a local area network or other, wide area network) and respective network adapters or interfaces 336. From the network adapters or interfaces 336, the software program 108 (FIG. 1) and the call screening program 110A (FIG. 1) in the client computing device 102 (FIG. 1) and the call screening program 110B (FIG. 1) in the server 112 (FIG. 1) are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
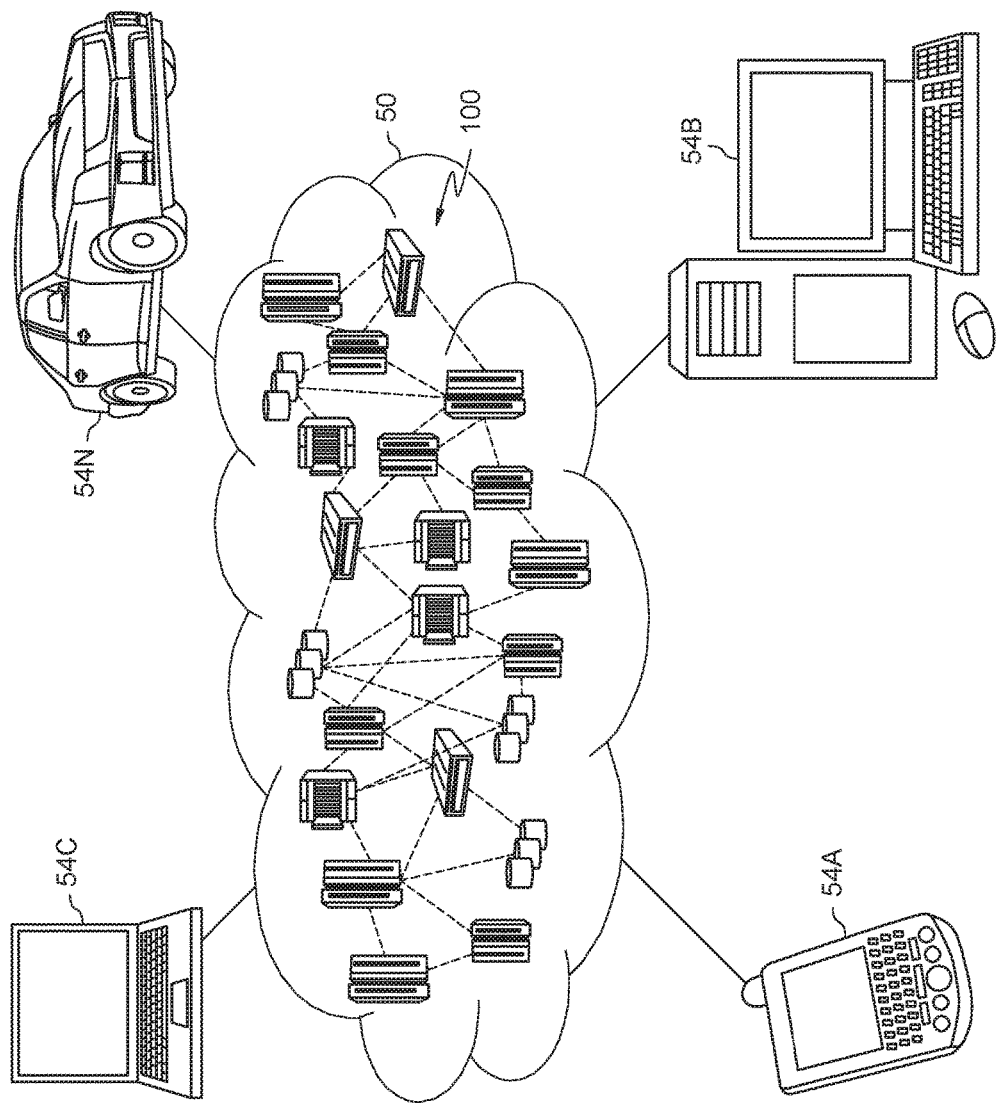
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
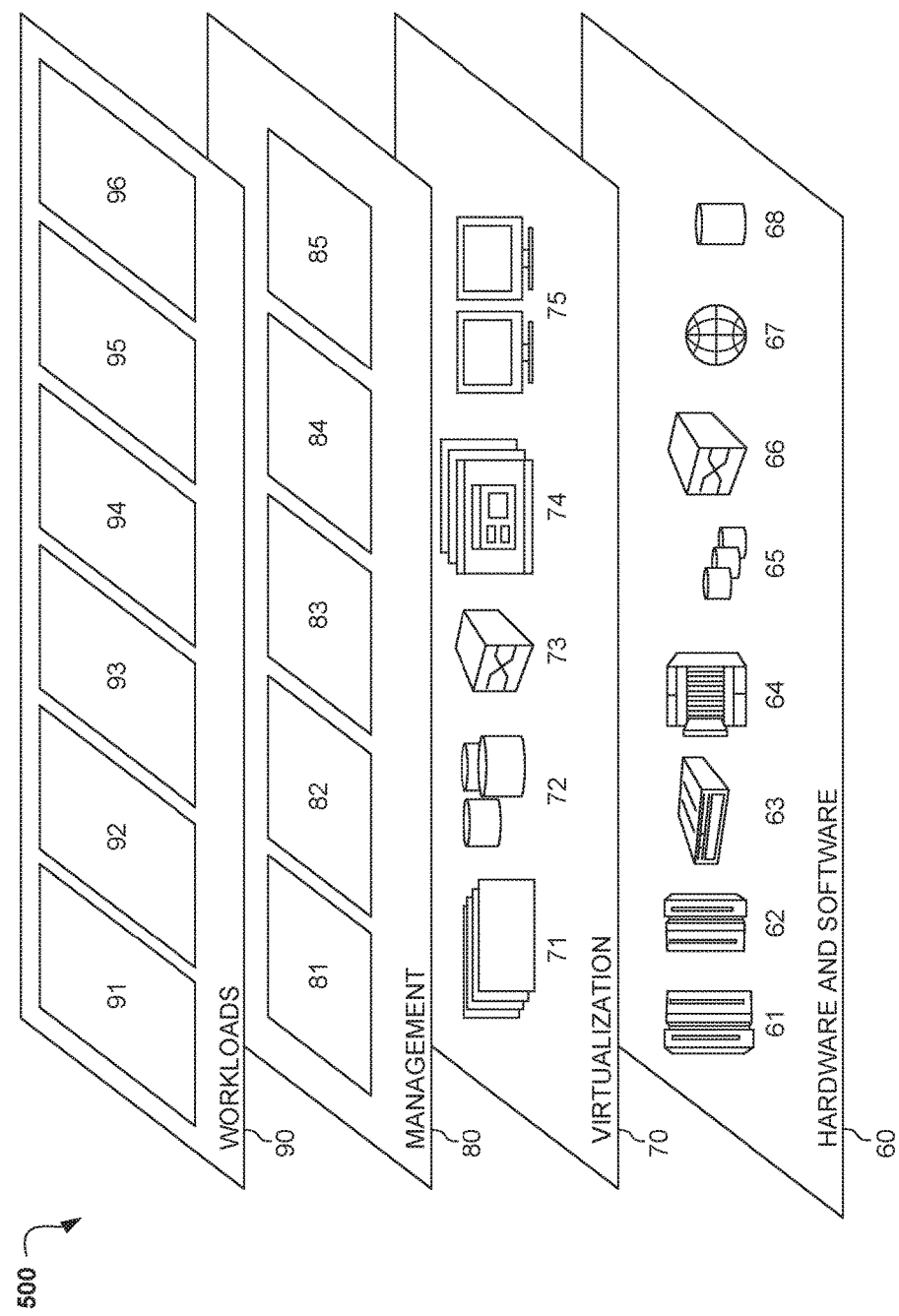
FIG. 5 depicts abstraction model layers according to an embodiment of the present invention.

Referring now to FIG. 5, a set of functional abstraction layers 500 provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and call screening 96. Call screening 96 may relate to analyzing incoming calls with stored call information from a database to determine whether an incoming call has high probability of being incorrectly dialed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for screening an incoming call, the method comprising:
   receiving, by a processor, a transmission of the incoming call in a user device;
   determining the incoming call originates from an area code of a telephone number associated with the user device;
   determining a plurality of call information associated with a telephone number of the incoming call is stored within a database based on determining the incoming call originates from the area code associated with the telephone number associated with the user device, wherein the plurality of call information comprises a plurality of telephone numbers associated with a plurality of previous calls to the user device;
   determining at least one previous call from the telephone number of the incoming call stored within the determined plurality of call information has a call duration that does not satisfy a user preconfigured call duration threshold based on determining the plurality of call information associated with the telephone number of the incoming call is stored within the database;
   determining the at least one determined previous call satisfies a maximum short call duration threshold based on determining the at least one previous call from the telephone number of the incoming call has a call duration that does not satisfy the user preconfigured call duration threshold;
   determining a previous call frequency count stored within the determined plurality of call information satisfies a user preconfigured frequency threshold based on determining the at least one determined previous call satisfies the maximum short call duration threshold; and
   displaying the incoming call and an incorrectly dialed call notification on a display screen of the user device based on determining the previous call frequency count satisfies the user preconfigured frequency threshold.

2. The method of claim 1, wherein determining the incoming call originates from an area code of a telephone number associated with the user device comprises determining an incoming call area code of an incoming call telephone number is identical to the area code of the telephone number associated with the user device.

3. The method of claim 1, wherein the displayed incorrectly dialed call notification comprises a plurality of text or a color scheme.

4. The method of claim 1, further comprising:
   receiving at least one user interaction with the user device;

determining the displayed incoming call should not be answered based on the at least one received user interaction; and transmitting the determined incoming call to a voicemail service.

5. The method of claim 1, further comprising:

receiving at least one user interaction with the user device;

determining the displayed incoming call should be answered based on the at least one received user interaction;

storing an incoming call telephone number, an incoming call caller name, and a call duration; and incrementing the previous call frequency count by one unit.

6. The method of claim 1, wherein the determined plurality of call information is selected from a group consisting of a plurality of telephone numbers associated with a plurality of previous calls to the user device, a plurality of previous caller names, a plurality of previous call durations, and a plurality of previous call frequencies.

7. The method of claim 1, wherein the determined previous call frequency count is a tally of at least one previous call from the telephone number associated with the incoming call as tracked by a scalar counter, and wherein the determined at least one previous call duration is a call length associated with each at least one previous call.

8. A computer system for screening an incoming call, the computer system comprising:

one or more processors, one or more computer-readable memories, one or more non-transitory computer-readable tangible storage medium, and program instructions stored on at least one of the one or more non-transitory tangible storage medium for execution by at least one of the one or more processors via at least one of the one or more memories, wherein the computer system is capable of performing a method comprising:

receiving a transmission of the incoming call in a user device;

determining the incoming call originates from an area code of a telephone number associated with the user device;

determining a plurality of call information associated with a telephone number of the incoming call is stored within a database based on determining the incoming call originates from the area code associated with the telephone number associated with the user device, wherein the plurality of call information comprises a plurality of telephone numbers associated with a plurality of previous calls to the user device;

determining at least one previous call from the telephone number of the incoming call stored within the determined plurality of call information has a call duration that does not satisfy a user preconfigured call duration threshold based on determining the plurality of call information associated with the telephone number of the incoming call is stored within the database;

determining the at least one determined previous call satisfies a maximum short call duration threshold based on determining the at least one previous call from the telephone number of the incoming call has a call duration that does not satisfy the user preconfigured call duration threshold;

determining a previous call frequency count stored within the determined plurality of call information satisfies a user preconfigured frequency threshold based on determining the at least one determined previous call satisfies the maximum short call duration threshold; and displaying the incoming call and an incorrectly dialed call notification on a display screen of the user device based on determining the previous call frequency count satisfies the user preconfigured frequency threshold.

9. The computer system of claim 8, wherein determining the incoming call originates from an area code of a telephone number associated with the user device comprises determining an incoming call area code of an incoming call telephone number is identical to the area code of the telephone number associated with the user device.

10. The computer system of claim 8, wherein the displayed incorrectly dialed call notification comprises a plurality of text or a color scheme.

11. The computer system of claim 8, further comprising:

receiving at least one user interaction with the user device;

determining the displayed incoming call should not be answered based on the at least one received user interaction; and transmitting the determined incoming call to a voicemail service.

12. The computer system of claim 8, further comprising:

receiving at least one user interaction with the user device;

determining the displayed incoming call should be answered based on at least one received user interaction;

storing an incoming call telephone number, an incoming call caller name, and a call duration; and incrementing the previous call frequency count by one unit.

13. The computer system of claim 8, wherein the determined plurality of call information is selected from a group consisting of a plurality of telephone numbers associated with a plurality of previous calls to the user device, a plurality of previous caller names, a plurality of previous call durations, and a plurality of previous call frequencies.

14. The computer system of claim 8, wherein the determined previous call frequency count is a tally of at least one previous call from the telephone number associated with the incoming call as tracked by a scalar counter, and wherein the determined at least one previous call duration is a call length associated with each at least one previous call.

15. A computer program product for screening an incoming call, the computer program product comprising:

one or more non-transitory computer-readable tangible storage medium and program instructions stored on at least one of the one or more non-transitory tangible storage medium, the program instructions executable by a processor, the program instructions comprising:

program instructions to receive a transmission of the incoming call in a user device;

program instructions to determine the incoming call originates from an area code of a telephone number associated with the user device;

program instructions to determine a plurality of call information associated with a telephone number of the incoming call is stored within a database based on determining the incoming call originates from the area code associated with the telephone number associated with the user device, wherein the plurality of call information comprises a plurality of telephone numbers associated with a plurality of previous calls to the user device;

program instructions to determine at least one previous call from the telephone number of the incoming call stored within the determined plurality of call information has a call duration that does not satisfy a user preconfigured call duration threshold based on determining the plurality of call information associated with the telephone number of the incoming call is stored within the database;

program instructions to determine the at least one determined previous call satisfies a maximum short call duration threshold based on determining the at least one previous call from the telephone number of the incoming call has a call duration that does not satisfy the user preconfigured call duration threshold;

program instructions to determine a previous call frequency count stored within the determined plurality of call information satisfies a user preconfigured frequency threshold based on determining the at least one determined previous call satisfies the maximum short call duration threshold; and program instructions to display the incoming call and an incorrectly dialed call notification on a display screen of the user device based on determining the previous call frequency count satisfies the user preconfigured frequency threshold.

16. The computer program product of claim 15, wherein determining the incoming call originates from an area code of a telephone number associated with the user device comprises determining an incoming call area code of an incoming call telephone number is identical to the area code of the telephone number associated with the user device.

17. The computer program product of claim 15, wherein the displayed incorrectly dialed call notification comprises a plurality of text or a color scheme.

18. The computer program product of claim 15, further comprising:
program instructions to receive at least one user interaction with the user device;
program instructions to determine the displayed incoming call should not be answered based on at least one received user interaction; and
program instructions to transmit the determined incoming call to a voicemail service.

19. The computer program product of claim 15, further comprising:
program instructions to receive at least one user interaction with the user device;
program instructions to determine the displayed incoming call should be answered based on the at least one received user interaction;
program instructions to store an incoming call telephone number, an incoming call caller name, and a call duration; and
program instructions to increment the previous call frequency count by one unit.

20. The computer program product of claim 15, wherein the determined plurality of call information is selected from a group consisting of a plurality of telephone numbers associated with a plurality of previous calls to the user device, a plurality of previous caller names, a plurality of previous call durations, and a plurality of previous call frequencies.

* * * * *